United States Patent
Heinzl

(10) Patent No.: US 9,694,324 B2
(45) Date of Patent: Jul. 4, 2017

(54) MULTISTAGE MEMBRANE DISTILLATION DEVICE

(75) Inventor: Wolfgang Heinzl, Ramerberg (DE)

(73) Assignee: Major Bravo Limited (VG)

( * ) Notice: Subject to any disclaimer, the term of this patent is extended or adjusted under 35 U.S.C. 154(b) by 957 days.

(21) Appl. No.: 13/878,540

(22) PCT Filed: Sep. 21, 2011

(86) PCT No.: PCT/EP2011/004726
§ 371 (c)(1),
(2), (4) Date: Jun. 24, 2013

(87) PCT Pub. No.: WO2012/048788
PCT Pub. Date: Apr. 19, 2012

(65) Prior Publication Data
US 2013/0319923 A1    Dec. 5, 2013

(30) Foreign Application Priority Data
Oct. 11, 2010    (DE) ........................ 10 2010 048 160

(51) Int. Cl.
*B01D 61/36*    (2006.01)
*B01D 1/26*    (2006.01)
(Continued)

(52) U.S. Cl.
CPC ........... *B01D 61/364* (2013.01); *B01D 61/36* (2013.01); *B01D 63/082* (2013.01); *B01D 1/26* (2013.01);
(Continued)

(58) Field of Classification Search
CPC ........ B01D 61/36; B01D 61/364; B01D 1/26; B01D 3/146; B01D 3/065; C02F 1/447; C02F 1/005; C02F 1/04; C02F 2103/08
See application file for complete search history.

(56) References Cited

U.S. PATENT DOCUMENTS 3,477,917 A    11/1969  Rodgers
6,716,355 B1 *   4/2004  Hanemaaijer ........ B01D 61/364
203/10

(Continued)

FOREIGN PATENT DOCUMENTS

DE    38 16 434 A1    11/1988
DE    196 17 396 A1    11/1997
(Continued)

OTHER PUBLICATIONS

Espacenet translation of Heinzl (WO 2005/089914 A1).*
(Continued)

*Primary Examiner* — In Suk Bullock
*Assistant Examiner* — Jonathan Pilcher
(74) *Attorney, Agent, or Firm* — Hershkovitz & Associates, PLLC; Abraham Hershkovitz; Eugene C. Rzucidlo

(57) ABSTRACT

The invention relates to a multistage membrane distillation device comprising a heating stage (28), preferably multiple condensing/evaporating stages (12), and a condensing stage (36) through which a liquid to be concentrated is passed in succession. Each condensing/evaporating stage comprises at least one condensing unit (K) and at least one evaporating unit (V). Each condensing unit comprises a first steam chamber that is delimited at least partly by a condensation wall (16), and each evaporating unit comprises a second steam chamber that is delimited at least partly by a steam-permeable liquid-tight membrane wall (20). At least one flow channel which is formed between such a condensing unit K and such an evaporating unit V that adjoins said condensing unit and which conducts the liquid to be concentrated is provided in each condensing/evaporating stage so that the liquid to be concentrated is heated by means of the condensation wall, and the steam that is generated from (Continued)

Figure 1:
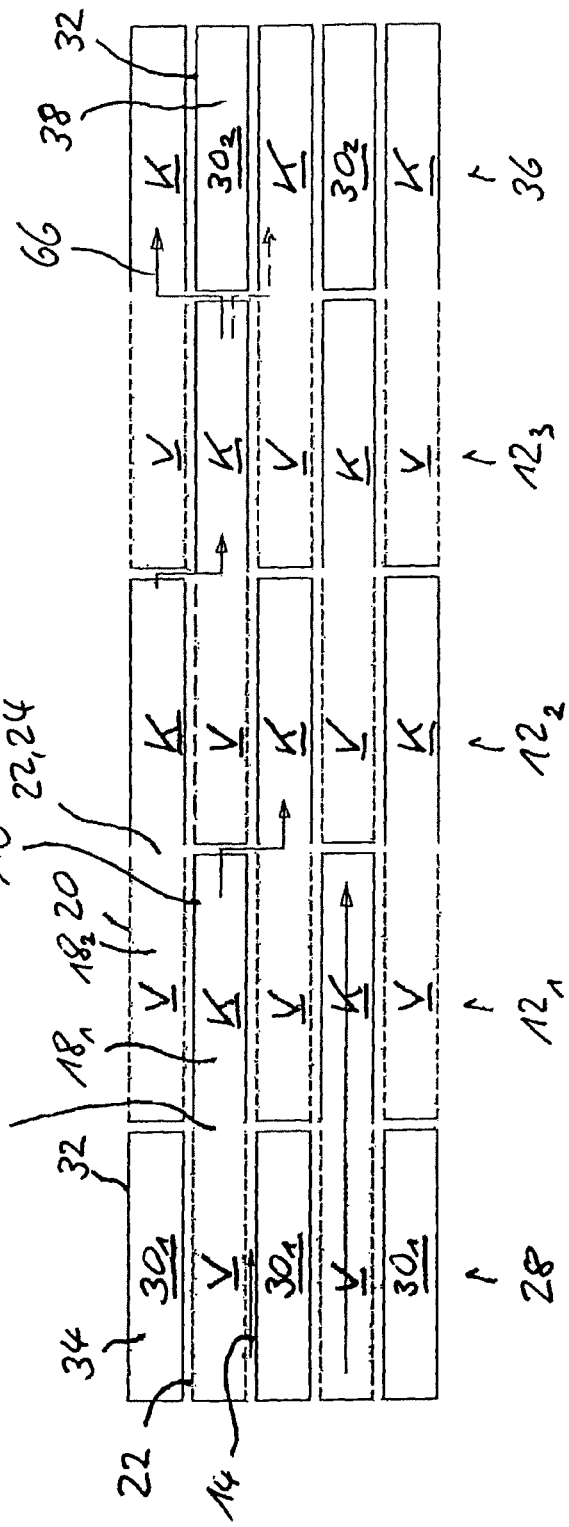

the liquid to be concentrated reaches the second steam chamber through the membrane wall. The steam that is produced in a respective preceding stage is conducted into a condensing unit of the immediately following stage via a steam channel which exclusively conducts said steam and which exclusively further conducts said steam to the immediately following stage.

21 Claims, 8 Drawing Sheets

(51) Int. Cl.
    *C02F 1/04*     (2006.01)
    *C02F 1/44*     (2006.01)
    *B01D 63/08*     (2006.01)

(52) U.S. Cl.
    CPC ............ *B01D 2313/38* (2013.01); *C02F 1/04* (2013.01); *C02F 1/447* (2013.01)

(56) References Cited

U.S. PATENT DOCUMENTS

2004/0211725 A1     10/2004     Jansen et al.
2009/0000939 A1     1/2009     Heinzl
2010/0072135 A1     3/2010     Hanemaaijer et al.

FOREIGN PATENT DOCUMENTS

| | | |
|---|---|---|
| DE | 10 2009 020 128 A1 | 11/2010 |
| EP | 1 844 846 A2 | 10/2007 |
| EP | 1 925 355 A1 | 5/2008 |
| JP | 2004-521734 | 12/2005 |
| JP | 2009-514668 | 11/2009 |
| WO | WO 2005/089914 A1 | 9/2005 |
| WO | WO 2007/054311 | 5/2007 |
| WO | WO 2010/127818 | 11/2010 |

OTHER PUBLICATIONS

English Abstract of JP 2004-521734.

English Abstract of JP 2009-514668.

Schneider K, et al., "Membrandestillation," Chemie Ingenieur Technik, vol. 56, No. 7, Jan. 1, 1984, p. 514-521, Wiley Vch. Verlag, Weinheim; DE.

English Translation of International Search Report mailed on Dec. 22, 2011.

English Abstract of WO 2007/054311.

English Abstract of DE 196 17 396 A1.

English Abstract of DE 38 16 434 A1.

* cited by examiner

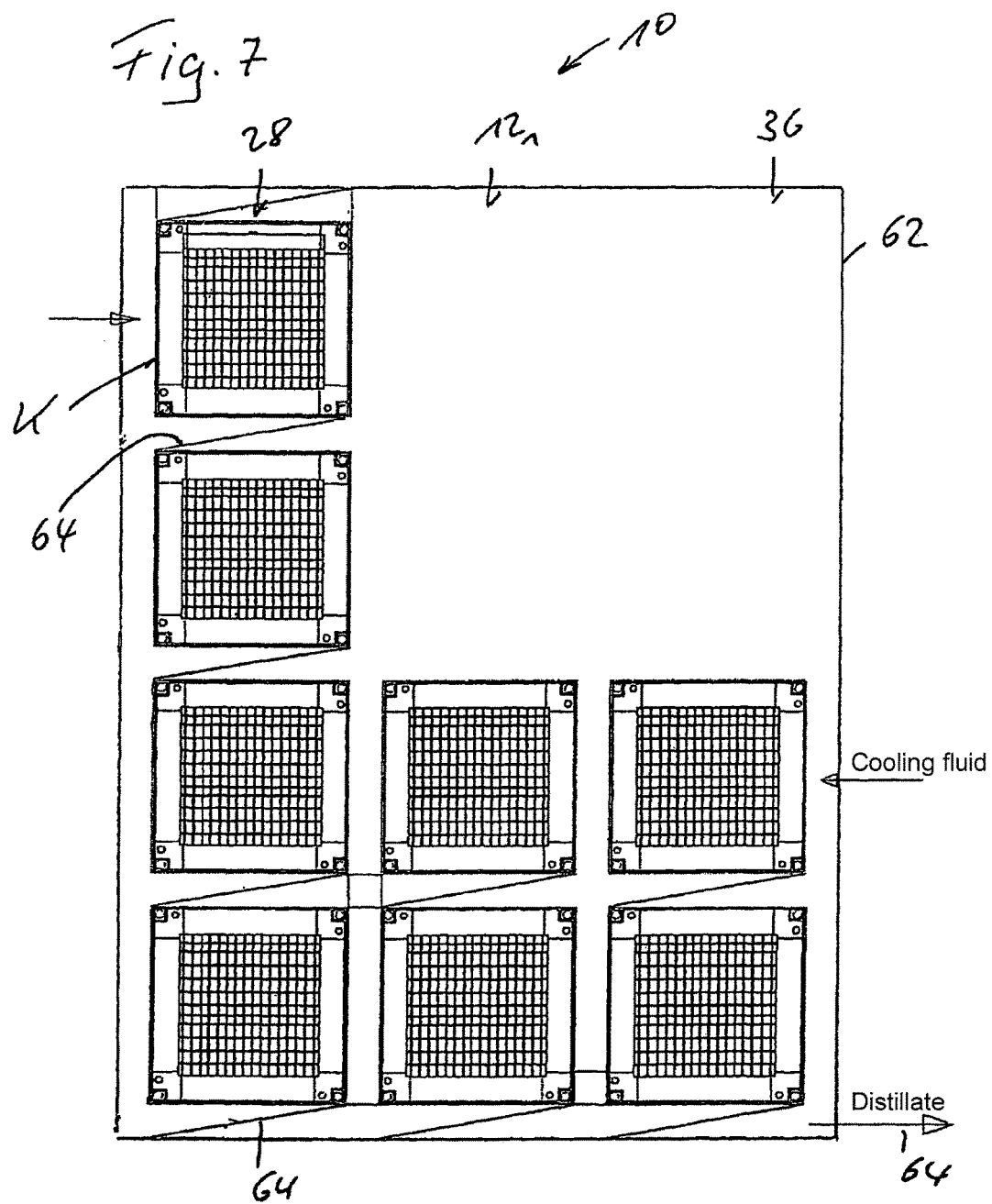

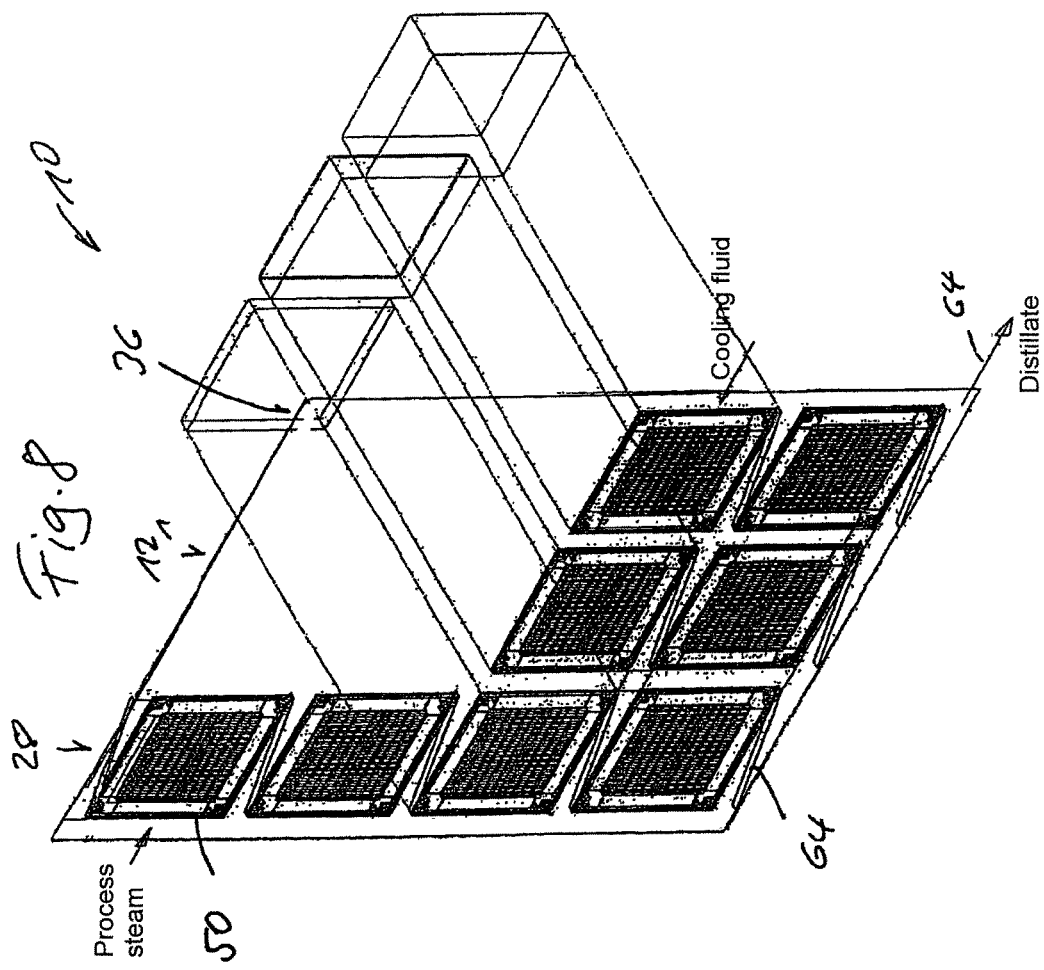

MULTISTAGE MEMBRANE DISTILLATION DEVICE

The invention relates to a multistage membrane distillation apparatus comprising a heating stage, preferably a plurality of condensation/evaporation stages and a condensation stage which are successively flowed through by a liquid to be concentrated, wherein every condensation/evaporation stage comprises at least one respective condensation unit and at least one respective evaporator unit; a respective condensation unit comprises a first steam space at least partly bounded by a condensation wall and a respective evaporator unit comprises second stream space at least partly bounded by a steam-permeable, liquid-tight membrane wall; and at least one flow passage, which is formed between such a condensation unit and such an evaporator unit adjacent to it and which conducts the liquid to be concentrated, is provided in a respective condensation/evaporation stage such that the liquid to be concentrated is heated via the condensation wall and the steam arising from the liquid to be concentrated moves through the membrane wall into the second steam space.

A membrane distillation apparatus of this type having two condensation/evaporation stages is described in WO 2007/054311.

It has previously been proposed to collect steam from the different stages in side steam passages (cf. the still unpublished DE 10 2009 020 128).

Since the steam volumes are summed in such steam collection passages and since higher flow speeds and friction losses occur, a design of a membrane distillation apparatus comprising a larger number of units is subject to limits, in particular by the flow speed.

It is substantially the underlying object of the invention to provide an improved multistage apparatus of the initially named kind in which the previously named problems are eliminated, in particular also with a larger number of stages.

This object is satisfied in accordance with the invention in that the steam arising in a respective preceding stage is conveyed into a condensation unit of the directly following stage via a steam passage which only conducts this steam and which only conducts this steam onward to the directly following stage.

On the basis of this design, the construction of a membrane distillation apparatus comprising a larger number of units or stages is practically no longer subject to any limits by the flow speed.

At least one respective condensation/evaporation stage can in each case have a plurality of condensation units and/or a plurality of evaporator units as well as a plurality of parallel flow passages which are each formed between a condensation unit and an evaporator unit adjacent to it and which conduct the liquid to be concentrated.

The steam arising in a respective steam space of a respective preceding stage is preferably conveyed via the respective steam passage into a respective only one condensation unit of the directly following stage.

It is in particular also of advantage if the evaporator unit has a steam outlet passage and the condensation unit has a steam inlet passage for forming a respective steam passage between a respective evaporator unit of a respective preceding stage and a respective condensation unit of a respective directly following stage and if the two units are arranged such that their sides having the steam outlet passage and the steam inlet passage respectively are directly adjacent to and face one another, with a gap, however, in particular still being able to remain therebetween for conducting away distillate.

In accordance with a preferred practical embodiment, the heating stage in which the supplied liquid to be concentrated is preheated comprises at least one heating unit and at least one evaporator unit, with a respective heating unit comprising a heating fluid space at least partly bounded by a fluid-tight, heat-conducting wall and a respective evaporate unit comprising a steam space at least partly bounded by a steam permeable, liquid-tight membrane wall and at least one flow passage, which is formed between a heating unit and an evaporating unit adjacent to it and which conducts the liquid to be concentrated, is provided in the heating stage so that the liquid to be concentrated is preheated via the fluid-tight, heat-conducting wall and the steam arising from the liquid to be concentrated moves through the membrane wall into the steam space.

In this respect, the steam is advantageously conveyed from the steam space of a respective evaporator unit of the heating stage into a condensation unit of this directly following condensation/evaporation stage via a steam passage, which only conducts this stream and which only conducts it onward to the directly following condensation/evaporation stage.

The heating stage can have a plurality of heating units and/or a plurality of evaporator units as well as a plurality of parallel flow passages which are each formed between a heating unit and an evaporator unit adjacent to it and which conduct the liquid to be concentrated.

The steam is preferably conveyed from the steam space of a respective evaporator unit of the heating stage via the respective steam passage into a respective only one condensation unit of the directly following condensation/evaporation stage.

It is of advantage in this respect if the evaporator unit has a steam outlet passage and the condensation unit has a steam inlet passage for forming a respective steam passage between a respective evaporator unit of the heating stage and a respective condensation unit of the directly following condensation/evaporation stage and if the two units are arranged such that their sides having the steam outlet passage and the steam inlet passage respectively are directly adjacent to and face one another, with a gap, however, in particular still being able to remain therebetween for conducting away distillate.

The steam from a respective evaporator unit of the last condensation/evaporation stage is preferably supplied to the condensation stage disposed directly downstream of the last condensation/evaporation stage.

In this respect, the condensation stage advantageously comprises at least one cooling unit and at least one condensation unit, wherein a respective cooling unit comprises a cooling fluid space at least partly bounded by a fluid-tight, heat-conducting wall and a respective condensation unit again comprises a steam space which is at least partly bounded by a condensation wall and to which steam is supplied from the last condensation/evaporation stage via a respective steam passage and at least one cooling unit is directly adjacent to at least one condensation unit in the condensation stage so that the condensation wall of the respective condensation unit is cooled via the cooling unit, with a gap still being able to be permitted in practice, however.

The steam from a respective evaporator unit of the last condensation/evaporation stage is expediently conducted into a condensation unit of the condensation stage via a steam passage which only conducts this steam and which only conducts it onward to the condensation stage.

The condensation stage can in particular comprise a plurality of cooling units and/or a plurality of evaporator units.

The steam is preferably conveyed from the steam space of a respective evaporator unit of the last condensation/evaporation stage via the respective steam passage into a respective only one condensation unit of the condensation stage.

It is of advantage in this respect if the evaporator unit has a steam outlet passage and the condensation unit has a steam inlet passage for forming a respective steam passage between a respective evaporator unit of the last condensation/evaporation stage and a respective condensation unit of the directly following condensation stage and if the two units are arranged such that their sides having the steam outlet passage and the steam inlet passage respectively are directly adjacent to and face one another, with a gap, however, in particular still being able to remain therebetween for conducting away distillate.

In accordance with a preferred practical embodiment, the multistage membrane distillation apparatus is designed as a modular flow system comprising a plurality of frame elements, wherein the different functional units such as in particular a respective condensation unit, a respective evaporator unit, a respective heating unit and/or a respective cooling unit may in each case be provided in the form of such a frame element. The frame elements can be provided with web structures via which they can in particular be connected to one another for forming the heating stage, a respective condensation/evaporation stage and/or the condensation stage. The frame elements can each comprise an inner region which is surrounded by an outer frame and which is preferably provided with an in particular grid-like spacer 46 on whose two sides a respective functional surface, preferably a film or membrane, can in particular be applied in particular for forming a respective steam space, a respective heating fluid space or a respective cooling fluid space.

The multistage or multi-effect membrane distillation apparatus can therefore in particular be built up of frame elements. The frame elements can comprise applied functional surfaces. In particular the following types of frame elements are conceivable: a frame element respectively provided at both sides with a membrane, a frame element respectively provided at both sides with a fluid-tight film, a frame element spanned by a film and having fluid passages. The multistage membrane distillation apparatus in accordance with the invention can be built up, for example, of such frame elements.

Water can, for example, be used as the heating fluid in the heating stage. Generally, however, a heating with steam can also take place. In the latter case, the multi-effect process then takes place in one or more condensation units to which the steam is supplied.

The liquid to be concentrated is heated via the heating units. The liquid to be concentrated can be conducted in parallel flow with the steam, in counterflow with the steam and/or per stage.

The solution to be concentrated is preferably at a boiling temperature corresponding to the absolute pressure across all stages in the steam space of a respective adjacent evaporator unit such as is described in WO 2007/054311 which is herewith included in the disclosure content of the present application.

The multistage membrane distillation apparatus can advantageously also comprise a preheating for the liquid to be concentrated in which the liquid to be concentrated flows in from the condensation stage and is conducted, for example, in frame elements provided with films. In this respect, the liquid to be concentrated is preferably preheated via steam. The total liquid to be concentrated can be conducted up to the heating stage or the quantity of liquid to be concentrated required per stage can be led off into the corresponding stage and into the flow passages.

The multistage membrane distillation apparatus can comprise a housing which is vacuum-tight with respect to the environment in which the different stages are accommodated.

The steam entering into the condensation units condenses at the condensation surfaces. The corresponding heat is transferred to the liquid to be concentrated via the respective surface. The steam arising therein passes through the membrane of the adjacent evaporator unit into its steam space which communicates with the pressure of the steam space of the respective condensation unit of the following condensation/evaporation stage.

The heating fluid spaces of the heating units of the heating stage are only connected to the condensation/evaporation section via bores provided, for example, in the respective frame elements for the non-condensable gases in the condensation units and via a restrictor at the bottom for conducting the distillate into the condensation/evaporation section. The absolute pressure in the condensation/evaporation section is lower than in the heating stage.

The steam arising in the steam space of a respective evaporation unit of the heating stage can enter into the steam space, disposed directly opposite it, of a respective condensation unit of the condensation/evaporation section and can condense there, with a gap, however, in particular still being able to remain therebetween for leading off distillate. Heat is also again transferred here and new steam arises in the steam space of the adjacent evaporation unit, with said steam space communicating with the pressure level of the steam space of an adjacent condensation unit of the condensation/evaporation section.

The web structures via which the individual frame elements can be connected to one another can, for example, be welded web structures or adhesive structures via which the frame elements are welded or bonded to one another. In the case of welded web structures, a friction welding process, a laser welding process and/or a heating element welding process can be used, for example, for connecting the frame elements.

The following advantages are obtained among others with the multistage membrane distillation apparatus in accordance with the invention:

Very large exchange surfaces can be installed over a smaller volume. The steam exiting a respective evaporation unit enters in the following stage into the steam space of a condensation unit. Steam volume flows are no longer summed so that increasing flow speeds no longer occur which previously limited a larger design of thermal plant.

Figure 2:
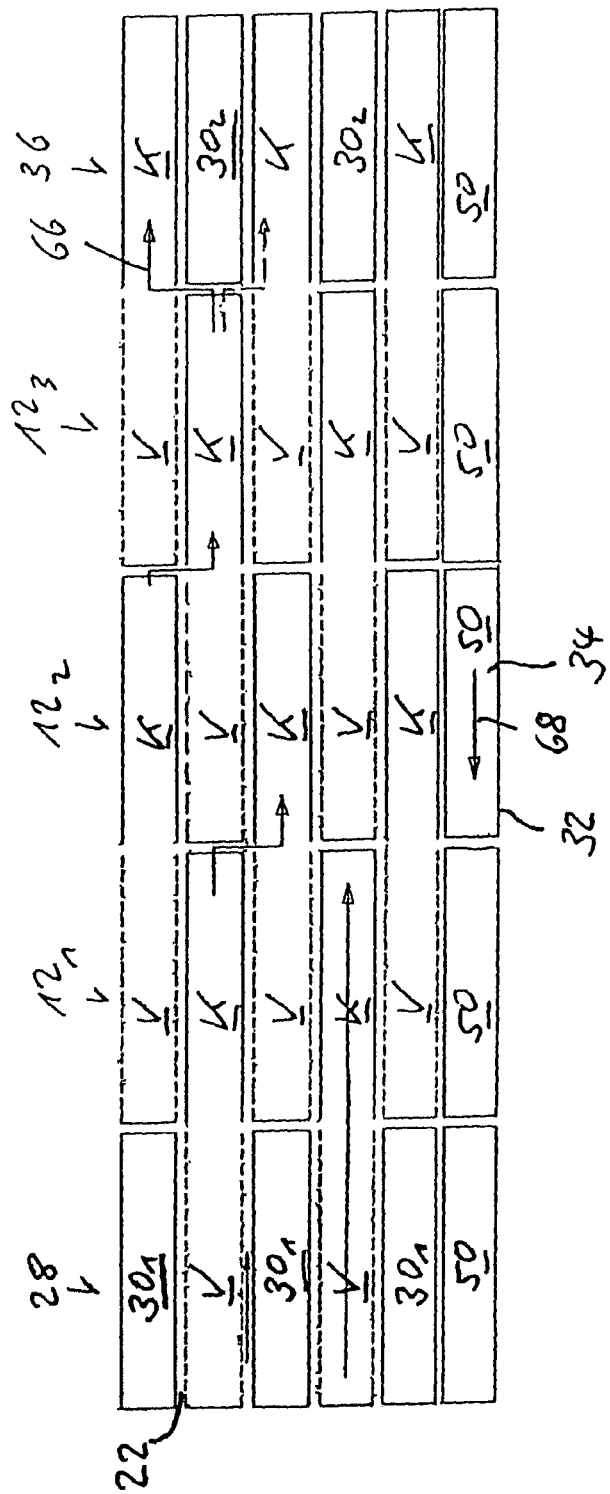
Figure 3:
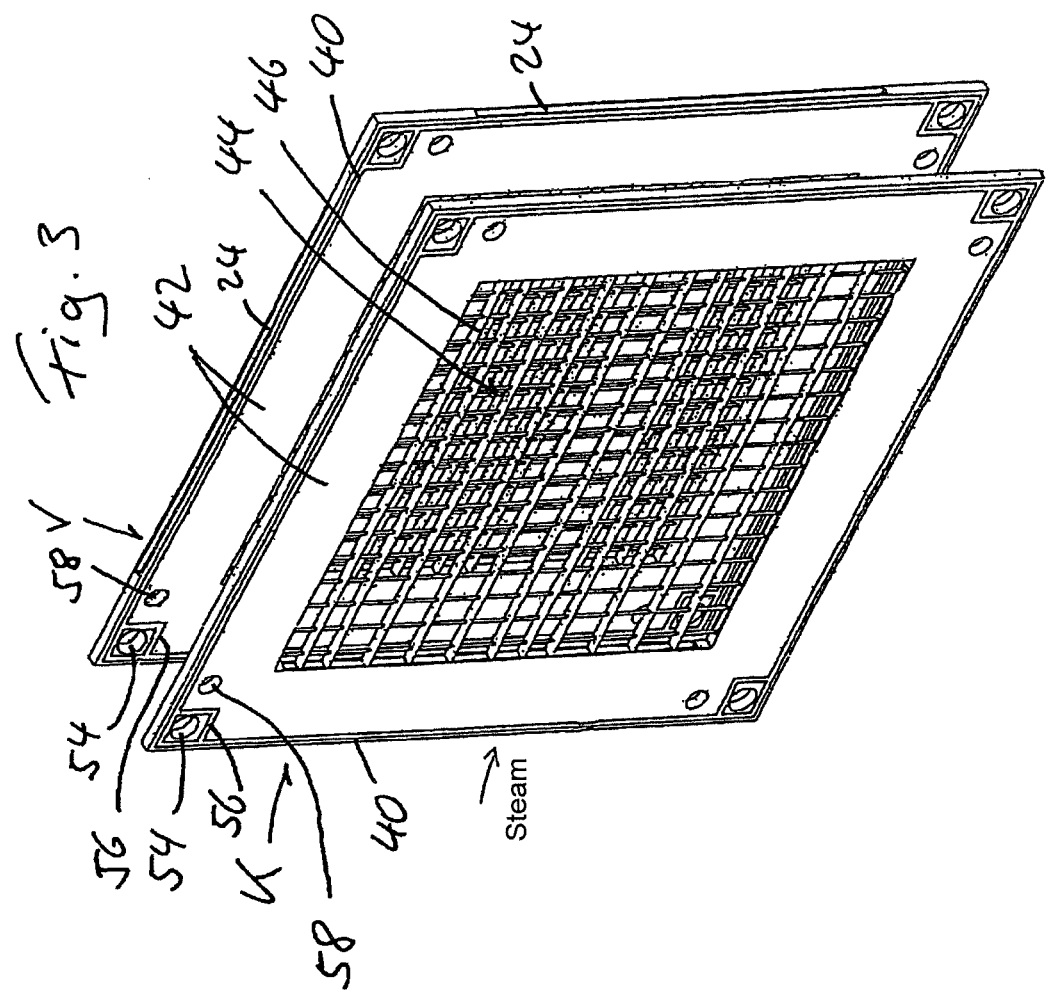
Figure 4:
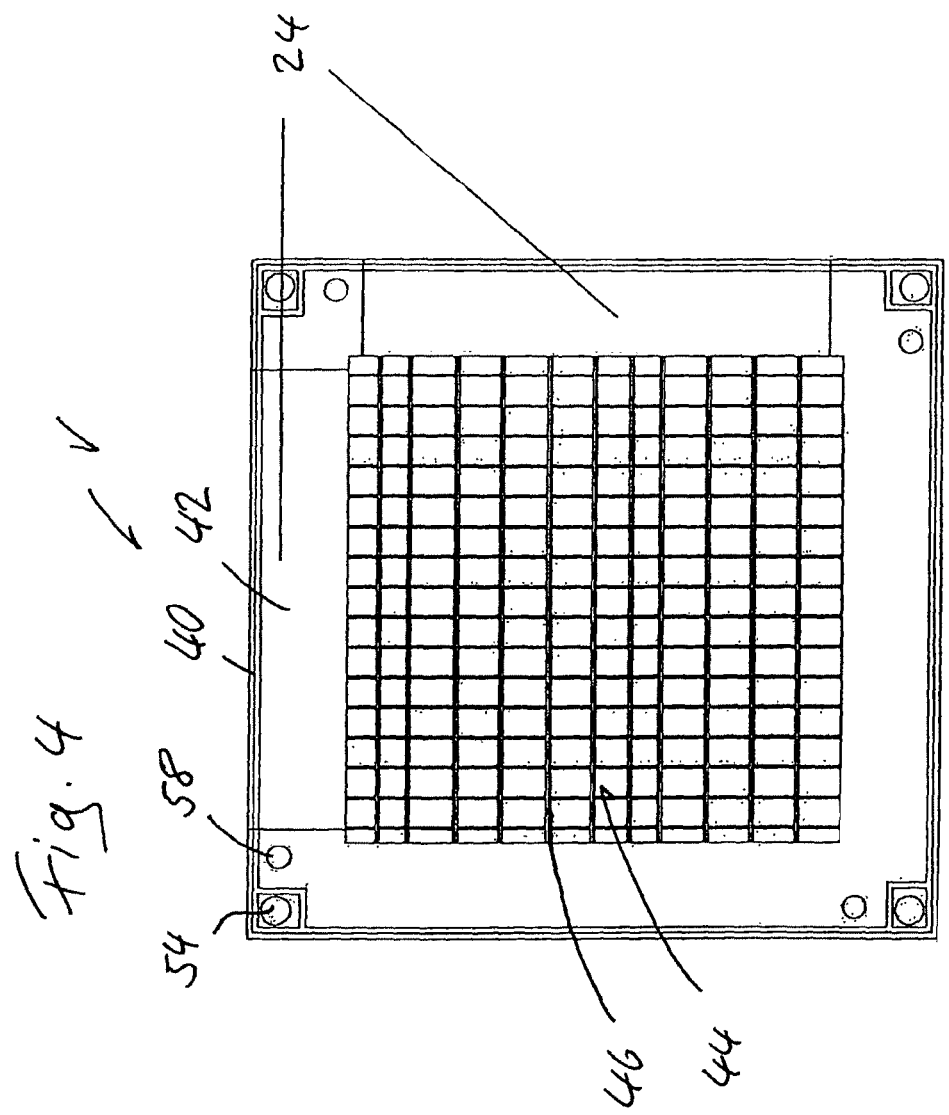
Figure 5:
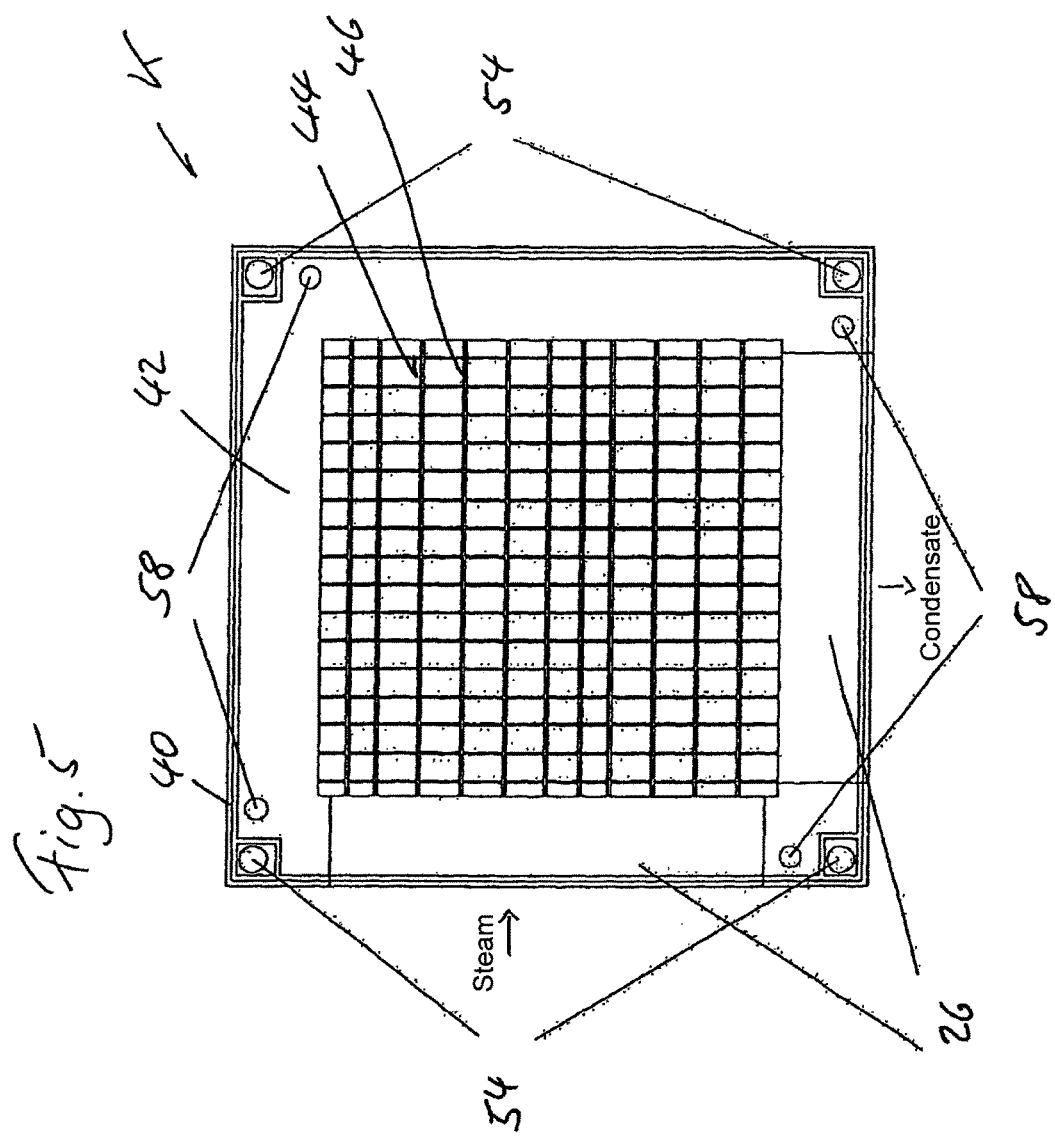
Figure 6:
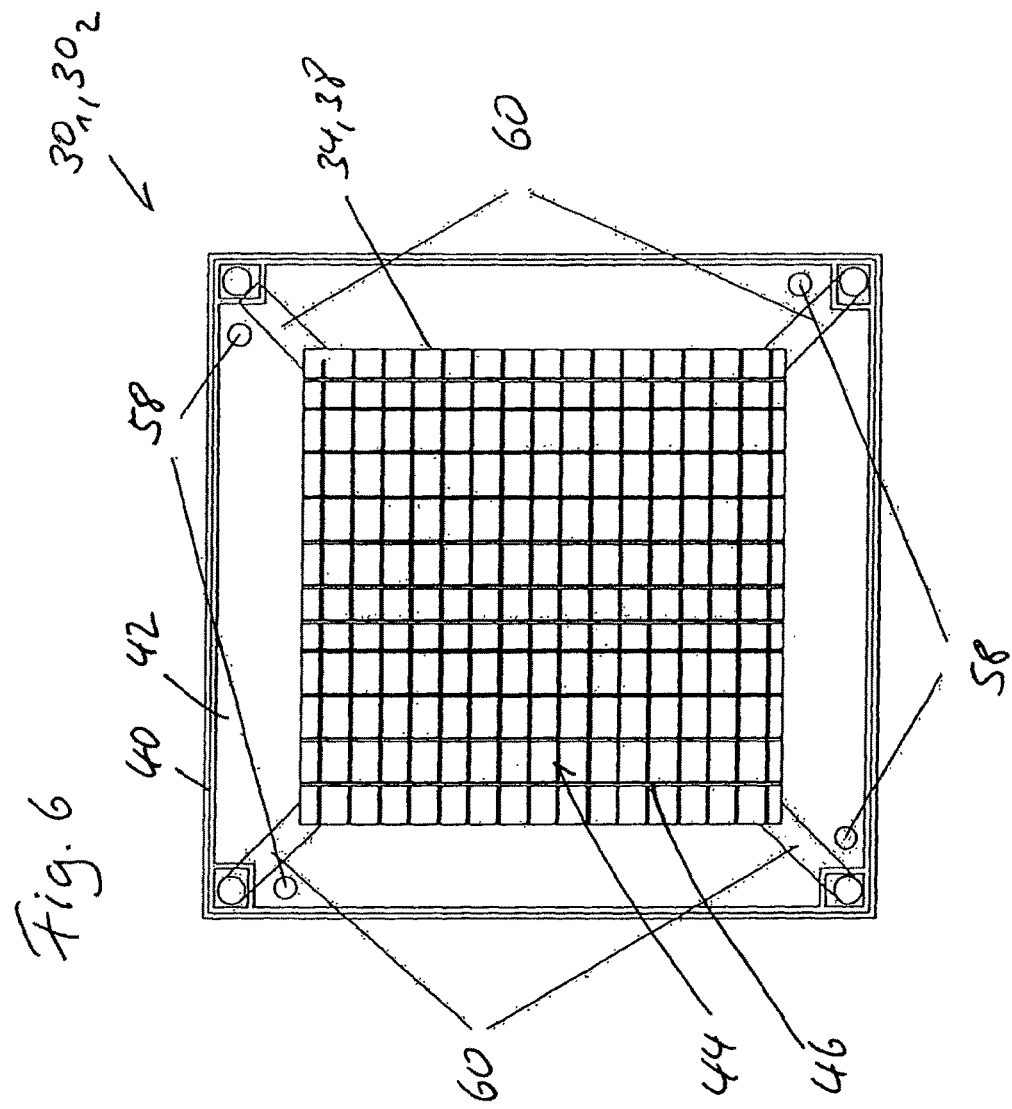

The invention will be explained in more detail in the following with reference to embodiments and to the drawing; there are shown in this:

FIG. 1 a schematic plan view of an exemplary embodiment of a multistage membrane distillation apparatus;

FIG. 2 an embodiment of the multistage membrane distillation apparatus comparable with the embodiment in accordance with FIG. 1, with a preheating of the liquid to be concentrated additionally being provided;

FIG. 3 an exemplary embodiment of a frame element designed as a condensation unit and an exemplary embodiment of a frame element designed as an evaporator unit in a perspective representation;

FIG. 4 a schematic front view of the frame element in accordance with FIG. 3 designed as an evaporator element;

FIG. 5 a schematic front view of the frame element in accordance with FIG. 3 designed as a condensation element;

FIG. 6 a schematic front view of an exemplary embodiment of a frame element which can be used both as a heating unit and as a cooling unit;

FIG. 7 a schematic front view of an exemplary embodiment of a multistage membrane distillation apparatus comprising a heating stage, a condensation/evaporation stage and a condensation stage; and FIG. 8 a schematic perspective view of an embodiment of the multistage distillation apparatus comparable with the embodiment in accordance with FIG. 7 in which additionally a preheating of the liquid to be concentrated is again provided.

FIG. 1 shows in a schematic plan view an exemplary embodiment of a multistage membrane distillation apparatus 10.

As can be seen, for example, from this representation in accordance with FIG. 1, such a multistage membrane distillation apparatus 10 comprises a heating stage 28, preferably a plurality of condensation/evaporation stages $12_1$-$12_3$ and a condensation stage 36. The stages 28, $12_1$-$12_3$, 36 are successively flowed through by a liquid 14 to be concentrated.

Every condensation/evaporation stage $12_1$-$12_3$ respectively comprises at least one condensation unit K and at least one evaporator unit V, with a respective condensation unit K comprising a first steam space $18_1$ at least partly bounded by a condensation wall 16 and with a respective evaporator unit V comprising a second steam space $18_2$ at least partly bounded by a steam-permeable, fluid-tight membrane wall 20.

At least one flow passage, which is formed between such a condensation unit K and such an evaporator unit V adjacent to it and which conducts liquid to be concentrated, is provided in a respective condensation/evaporation stage $12_1$-$12_3$ so that the liquid 14 to be concentrated 14 is heated via the condensation wall 16 and the steam arising from the liquid 14 to be concentrated moves through the membrane wall 20 into the second steam space $18_2$.

In this respect, the steam arising in a respective preceding stage 28, $12_1$-$12_3$ is conveyed into a condensation unit K of the directly following stage $12_1$-$12_3$, 36 via a steam passage 24, 26 (see e.g. FIGS. 3-5), which only conducts this steam and which only conducts it to the directly following stage $12_1$-$12_3$, 36.

The multistage membrane distillation apparatus 10 preferably comprises more than three condensation/evaporation stages $12_1$-$12_3$. Generally, however, fewer than three such condensation/evaporation stages can also be provided.

As results, for example, from FIGS. 7 and 8, more stages 28, $12_1$-$12_3$, 36 can in particular also be arranged beneath one another.

At least one respective condensation/evaporation stage $12_1$-$12_3$ can also have a respective plurality of condensation units K and/or a plurality of evaporator units V and a plurality of parallel flow passages 22 formed between a condensation unit K and an evaporator unit V adjacent to it and conducting the liquid 14 to be concentrated.

The steam arising in a respective steam space $18_2$ of a respective preceding stage 28, $12_1$-$12_3$ is preferably conveyed via the respective steam passage 24, 26 into a respective one condensation unit K of the directly following stage $12_1$-$12_3$, 36.

The evaporator unit V can have a steam outlet passage 24 (cf. FIGS. 3 and 4, for example) and the condensation unit K can have a steam inlet passage 26 (cf. FIG. 5, for example) for forming a respective steam passage 24, 26 between a respective evaporator unit V of a respective preceding stage 28, $12_1$-$12_3$ and a respective condensation unit K of a respective directly following stage $12_1$-$12_3$, 36. In this respect, the two units V, K are preferably arranged so that their sides having the steam outlet passage 24 and the steam inlet passage 26 respectively are directly adjacent to and face one another, with a gap, however, in particular still being able to remain for leading off distillate (cf. FIG. 1, for example).

The supplied liquid to be concentrated can be preheated in the heating stage 26. In this respect, such a heating stage 28 can, for example, comprise at least one heating unit $30_1$ and at least one evaporator unit V, wherein a respective heating unit $30_1$ comprises a heating fluid space 34 at least partly bounded by a fluid-tight, heat conducting wall 32 and a respective evaporator unit V comprises a steam space $18_2$ at least partly bounded by a steam-permeable, fluid-tight membrane wall 20.

In this respect, at least one flow passage 22, which is formed between a heating unit $30_1$ and an evaporator unit V adjacent to it and which conducts liquid 14 to be concentrated, is provided in the heating stage 28 so that the liquid 14 to be concentrated is preheated via the fluid-tight, heat-conducting wall 32 and the steam arising from the liquid 14 to be concentrated moves through the membrane 20 into the steam space $18_2$.

The steam from the steam space $18_2$ of a respective evaporator unit V of the heating stage 28 can be conveyed into a condensation stage K of this directly following condensation/evaporation stage $12_1$-$12_3$ via a steam passage 24, 26 which only conducts this steam and which only conducts it onward to the directly following condensation/evaporation stage $12_1$-$12_3$.

The heating stage 28 can have a plurality of heating elements $30_1$ and/or a plurality of evaporate units V and a plurality of parallel flow passages 22 which are respectively formed between a heating unit $30_1$ and an evaporator unit V adjacent to it and which conducts the liquid 14 to be concentrated.

The steam is preferably conveyed from the steam space $18_2$ of a respective evaporator unit V of the heating stage 28 via the respective steam channel 24, 26 into a respective only one condensation unit K of the directly following condensation/evaporation stage $12_1$-$12_3$.

The evaporator unit V can have a steam outlet passage 24 (cf. e.g. FIGS. 3 and 4) and the condensation unit K can have a steam inlet passage 26 (cf. e.g. FIG. 5) for forming a respective steam passage 24, 26 between a respective evaporator unit V of the heating stage 28 and a respective condensation unit K of the directly following condensation/evaporation stage $12_1$-$12_3$. In this respect, the two units V, K can then be arranged so that their sides having the steam outlet passage 24 and the steam inlet passage 26 respectively are directly adjacent to and face one another with a gap, however, in particular still being able to remain for leading off distillate.

The steam from a respective evaporator unit V of the last condensation/evaporation stage $12_3$ can be supplied to the condensation stage 36 disposed directly downstream of the last condensation/evaporation stage $12_3$.

As can likewise again be seen from FIG. 1, the condensation stage 36 can comprise at least one cooling unit $30_1$ and at least one condensation unit K. In this respect, a respective cooling unit $30_2$ can have a cooling fluid space 38 at least partly bounded by a fluid-tight, heat-conducting wall 32 and a respective condensation unit K can in particular again have a steam space $18_1$ which at least partly bounded by a condensation wall 16, and to which steam from the last condensation/evaporation stage $12_3$ is supplied to via a respective steam passage 24, 26. At least one cooling unit $30_2$ is preferably directly adjacent to at least one condensation unit K in the condensation stage K so that the condensation wall 16 of the respective condensation unit K is cooled via the cooling unit $30_2$, with a gap still being able to remain in this case, too.

The steam from a respective evaporator unit V of the last condensation/evaporation stage $12_3$ is preferably conducted into a condensation unit K of the condensation stage 36 via a steam passage 24, 26, which only conducts this steam and which only conducts it onward to the condensation stage 36.

The condensation stage 36 can comprise a plurality of cooling units $30_2$ and/or a plurality of evaporator units V.

The steam from the steam space $18_2$ of a respective evaporator unit V of the last condensation/evaporation stage $12_3$ is preferably conveyed via the respective steam passage 24, 26 into a respective only one condensation unit K of the condensation stage 36.

The evaporator unit V can again have a steam outlet passage 24 and the condensation unit K can again have a steam inlet passage 26 for forming a respective steam passage 24, 26 between a respective evaporator unit V of the last condensation/evaporation stage $12_3$ and a respective condensation stage K of the directly following condensation stage 36. The two units V, K can then in particular again be arranged so that their sides having the steam outlet passage 24 and the steam inlet passage 26 respectively are directly adjacent to and face one another with a gap, however, in particular still being able to remain for leading off distillate.

In all the previously named cases, a respective steam passage 24, 26 can also in particular be formed by a steam outlet passage 24 and a steam inlet passage 26 in that the two respective units V, K are arranged relative to one another so that their sides having the steam outlet passage 24 and the steam inlet passage 26 respectively are directly adjacent to and face one another, with a gap, however, still in particular being able to remain for leading off distillate.

The two units V, K are then expediently connected to one another in the region of these steam outlet passages and steam inlet passages 24, 26 respectively so that steam can preferably move from the steam outlet passage 24 at least substantially directly into the steam inlet passage 26.

A heating with water can, for example, take place in the heating stage 28. A different heating fluid is, however, generally also conceivable.

The leading off of non-condensable gases is indicated by arrows 66.

The process can also be heated with steam, with in this case a respective heating unit, for example, being able to be replaced with a respective condensation unit.

The liquid to be concentrated is heated via a respective heating unit. The liquid to be concentrated can, for example, be conducted in parallel flow with the steam, in counterflow with the steam and/or per stage.

As already initially stated, the liquid to be concentrated is preferably at the boiling temperature corresponding to the absolute pressure in the respective steam space across all stages for the multi-effect process. Reference is in particular again made in this respect to WO 2007/054311 which is included in the disclosure content of the present application.

FIG. 2 shows an embodiment of a multistage membrane distillation apparatus 10 comparable with the embodiment in accordance with FIG. 1, with it, however, being able to be seen from this FIG. 2, for example, that a preheating 68 of the liquid 14 to be concentrated can additionally be provided in a respective two-stage membrane distillation apparatus 10. The liquid 14 to be concentrated can be supplied from the condensation stage 36. It can in this respect be conducted in preheating units 50. These preheating units 50 can, for example, again have a fluid space 34 at least partly bounded by a fluid-tight, heat-conducting wall 32. The preheating can in particular take place via steam. The total liquid 14 to be concentrated can in particular be conducted up to the heating stage 28 or the quantity of liquid to be concentrated required per stage can, for example, be led off into the corresponding stage and into the flow passages 22 conducting the liquid to be concentrated.

In another respect, this multistage membrane distillation apparatus 10 comprising a preheating can in particular again be designed at least substantially, for example, as was described with reference to FIG. 1. Parts corresponding to one another have had the same reference numerals associated with them.

As can, for example, be seen from FIGS. 3 to 6, the multistage membrane distillation apparatus 10 can in particular be designed as a modular flow system comprising a plurality of frame elements. In this respect, for example, the different functional units such as in particular a respective condensation unit K, a respective evaporator unit V, a respective heating unit $30_1$, a respective cooling unit $30_2$ and/or a respective preheating unit 50 can each be provided in the form of a such a frame element.

The frame elements are preferably provided with web structures 40 via which they can in particular be connected to one another for forming the heating stage 28, a respective condensation/evaporation stage $12_1$-$12_3$ and/or the condensation stage 36. In this respect, the different frame elements can, for example, be welded or bonded to one another via the web structures 40. If, for example, weld web structures are used, a friction welding process, a laser welding process and/or a heating element welding process can be used for connecting the frame elements, for example.

The frame elements each include an inner region 44 which is surrounded by an outer frame 42 and which is preferably provided with an in particular grid-like spacer 46.

FIG. 3 shows in a perspective representation an exemplary embodiment of a frame element designed as a condensation unit K and an exemplary embodiment of a frame element designed as an evaporator unit V.

A respective film or membrane can in particular be applied to the two sides of such an in particular grid-like spacer 46 to form the respective functional surfaces, in particular for forming a respective steam space $18_1$, $18_2$, a respective heating fluid space 34, a respective cooling fluid 38 or for implementing a respective preheating unit 50.

In this respect, in the case of a condensation unit K, films are preferably used and in the case of an evaporator unit V, steam-permeable, fluid-tight membranes are preferably used.

In FIG. 3, the two frame elements provided in the form of a condensation unit K or of an evaporation unit V are arranged relative to one another in accordance with the function to be satisfied, with the frame element provided in the form of the condensation unit K in particular being able to be spanned with condensation film and the frame element provided in the form of the evaporation unit V in particular being able to be spanned with membrane. On a heating of the multistage membrane distillation apparatus, the frame element provided in the form of a condensation unit K can, for example, be open to the left and to the bottom so that steam can enter into this condensation unit K and can condense in it. The frame element provided in the form of a condensation unit V in particular preferably has a total of at least one or a plurality of leadthroughs for the non-condensable gases at the closed sides.

A respective flow passage 22 conducting the liquid to be concentrated results between the membrane and the film by the bringing together of a frame element provided in the form of a condensation unit K and provided with a film and of a frame element provided in the form of an evaporation unit V and provided with a membrane.

A spacer can still be inserted into this flow passage 22. Instead of such a spacer, the in particular grid-like spacer 46 can also be configured, for example, such that defined channels for conducting the solution are formed on the filling of the flow passage 22.

As can be recognized from FIG. 3, the outer frames 42 of the two units K, V respectively provided in the form of a frame element can each be provided with passage openings 54, in particular for heating fluid or cooling fluid. As can be recognized from FIG. 3, for example, a respective such passage opening 54 can, for example, be provided in each corner region of a respective frame element. Such a passage opening 54 can moreover, as can likewise be seen from FIG. 1, for example, also be delineated toward the inner region 44 by a web section 56.

The outer frame 42 of the frame elements provided, for example, in the form of a condensation unit K or of an evaporator unit V can moreover in each case be provided with passage openings 58, in particular for the liquid to be concentrated. These passage openings 58 admittedly likewise lie within the outer part of the web structures 40, but unlike the passage openings 54, they are not delineated with respect to the inner region 44. As can again likewise be recognized with reference to FIG. 3, a respective such passage opening 58 can be provided in the corner regions of a respective outer frame 42.

On a heating of the membrane distillation apparatus, the frame-shaped condensation unit K can be open to the left or to the bottom so that steam can enter and condense. This condensation unit K can have in total at least one or a plurality of leadthroughs for the non-condensable gases at the closed sides.

A steam outlet passage 24 opening upwardly and to the side right can be recognized in the evaporator unit V shown in FIG. 3.

FIG. 4 shows in a schematic front view the frame element in accordance with FIG. 3 designed as an evaporator unit V. Parts corresponding to one another have had the same reference numerals associated with them.

In the present case, a respective one membrane is preferably arranged at the two sides of the spacer 46.

The frame-like evaporator unit V can e.g. be open to the right and to the top so that steam can exit at the unit.

FIG. 5 shows in a schematic front view the frame element in accordance with FIG. 3 designed as a condensation unit K.

The passage openings 54 serving as a water channel, for example, and the passage openings 58 in particular serving as a passage for the liquid to be concentrated can inter alia be recognized in FIG. 5. In the present case, in particular a respective film can be provided at both sides of the spacer 16.

Parts corresponding to one another have had the same reference numerals associated with them.

The frame element respectively provided with a film at both sides of the spacer 46, for example, in the present case can in particular be used for the condensation of heating steam or steam originating from a respective evaporator unit.

FIG. 6 shows in a schematic front view an exemplary embodiment of a frame element which can be used as a heating unit $30_1$ or as a cooling unit $30_2$. The spacer 46 is in the present case in particular provided with a respective film at both sides. The heating fluid space or cooling fluid space 34 or 38 respectively formed between the films is flowed through by the heating fluid or cooling fluid, e.g. water. The heating fluid or cooling fluid is supplied to and again removed from the heating fluid space or cooling fluid space 34 and 38 respectively via passages 60, e.g. water passages.

In particular the passage openings 58 serving as passages for the liquid to be concentrated can also again be recognized in FIG. 6.

This frame element can e.g. be etched into the heating stage or as a cooling element in the condensation stage.

Parts which correspond to those of the other Figures are again also provided with the same reference numerals in this FIG. 6.

FIG. 7 shows in a schematic front view an exemplary embodiment of a multistage membrane distillation apparatus 10 comprising a heating stage 28, a condensation/evaporation stage $12_1$ and a condensation stage 36. The respective multistage membrane distillation apparatus can therefore in particular be a three-stage membrane distillation apparatus.

As can be recognized with respect to FIG. 7, a plurality of rows of stages 28, $12_1$, 36 can be arranged beneath one another.

The membrane distillation apparatus 10 can comprise a housing 62 in which the different stages 28, $12_1$, 36 are received and which is preferably vacuum-tight toward the environment.

In the embodiment shown in FIG. 7, heating stages 28 arranged in parallel above one another are arranged on the left side, with the membrane distillation apparatus 10 being heated in the present case, for example, via process steam supplied from the left side. This steam can originate, for example, from a steam turbine.

The steam entering into condensation units K or corresponding frame elements of the heating stage 28 condenses at the condensation wall formed by films, for example. The heat is transferred via the surface to the liquid to be concentrated from which steam arises through the adjacent membrane of an adjacent evaporator unit or of a corresponding frame element into the respective steam space which communicates with the pressure of the steam space of the respective condensation unit or of the respective frame element of the following stage.

A respective cooling fluid space of the heating stage 28 is preferably connected only via bores for the non-condensable gases in the condensation units and via a restrictor at the bottom for conducting the distillate in the condensation/evaporation $12_1$ to the condensation/evaporation stage. The absolute pressure in the condensation/evaporation stage 12 is lower than in the heating stage 28.

The steam arising in a respective steam passage of the heating stage 28 can enter into the respective directly oppositely disposed steam space of a respective condensation unit of the condensation/evaporation stage $12_1$ and can condense, with a gap, however, in particular still being able to remain therebetween for leading off distillate. Heat is again also transferred here and new steam arises in the steam space of a respective adjacent evaporator unit of the condensation/evaporation stage $12_1$ which communicates with the pressure level of the steam space of the respective condensation unit of the condensation stage 36.

A condensate conveying device 64 can moreover be recognized in FIG. 7 between stages arranged beneath one another, for example.

Parts which correspond to those of the other Figures are provided with the same reference numerals.

FIG. 8 shows in a schematic perspective view an embodiment of the multistage membrane distillation apparatus 10 comparable with the embodiment in accordance with FIG. 7 in which, however, a preheating of the liquid to be concentrated is again additionally provided. In this respect, this preheating can, for example, again be designed as was described in connection with FIG. 2. Parts corresponding to one another have again had the same reference numerals associated with them.

Very large exchange surfaces can be installed in a small volume using the multistage membrane distillation apparatus in accordance with the invention. The different units of the membrane distillation apparatus can in particular be implemented by corresponding frame elements which can, as can be seen from the Figures, in particular be of plate form. The steam exiting a respective unit generating steam enters in the directly following stage into a condensation passage or into the steam space of a condensation unit. No steam volume flows are summed and thus no increasing flow speeds arise which previously limited thermal plant.

REFERENCE NUMERAL LIST 10 membrane distillation apparatus
$12_1$-$12_3$ condensation/evaporation stage
14 liquid to be concentrated
16 condensation wall
$18_1$ first steam space
$18_2$ second steam space
20 membrane wall
22 flow passage
24 steam outlet passage
26 steam inlet passage
24, 26 steam passage
28 heating stage
$30_1$ heating unit
$30_2$ cooling unit
32 fluid-tight, heat-conducting wall
34 fluid space
36 condensation stage
38 cooling fluid space
40 web structure
42 outer frame
44 inner region
46 spacer
50 preheating unit
54 passage opening
56 web section
58 passage opening
60 passage, e.g. water passage
62 housing
64 condensate lead-off
66 non-condensable gases
68 preheating of the liquid to be concentrated
K condensation unit
V evaporator unit

The invention claimed is:

1. A multistage membrane distillation apparatus (10) comprising a heating stage (28), at least one condensation/evaporation stage ($12_1$-$12_3$) and a condensation stage (36), which are successively flowed through by a liquid (14) to be concentrated, each of said at least one condensation/evaporation stage ($12_1$-$12_3$) comprising:
  a plurality of condensation units (K), a plurality of evaporator units (V) and a plurality of flow passages (22) extending in parallel with each other and conducting the liquid (14) to be concentrated,
  wherein each flow passage (22) of said plurality of flow passages (22) is formed between a condensation unit (K) of said plurality of condensation units (K) and an evaporator unit (V) of said plurality of evaporator units (V) adjacent to the condensation unit (K),
  wherein each condensation unit (K) of said plurality of condensation units (K) has a first steam space ($18_1$) which is at least partly bounded by a condensation wall (16);
  wherein each evaporator unit (V) of said plurality of evaporator units (V) has a second steam space ($18_2$) at least partly bounded by a steam-permeable, liquid tight membrane wall (20);
  wherein the liquid (14) to be concentrated is heated via the condensation wall (16) and the steam arising from the liquid (14) to be concentrated moves through the membrane wall (20) into the second steam space ($18_2$),
  wherein the steam arising in a respective second steam space ($18_2$) of a respective preceding stage (28, $12_1$-$12_3$, 36) is respectively conveyed into a condensation unit (K) of the directly following stage ($12_1$-$12_3$, 36) via a steam passage (24, 26) only conducting this steam and only conducting the steam onward to the directly following stage ($12_1$-$12_3$, 36), and
  wherein the steam arising in a respective second steam space ($18_2$) of a respective preceding stage (28, $12_1$-$12_3$) is respectively conveyed via the respective steam passage (24, 26) into only one condensation unit (K) of the directly following stage ($12_1$-$12_3$, 36).

2. A multistage membrane distillation apparatus in accordance with claim 1, said apparatus further comprising a plurality of condensation/evaporation stages ($12_1$-$12_3$).

3. A multistage membrane distillation apparatus in accordance with claim 1, wherein the evaporator unit (V) has a steam outlet passage (24) and the condensation unit (K) has a steam inlet passage (26) for forming a respective steam passage (24, 26) between a respective evaporator unit (V) of a respective preceding stage (28, $12_1$-$12_3$) and a respective condensation unit (K) of a directly following stage ($12_1$-$12_3$, 36) and the respective evaporator unit (V) and the respective condensation unit (K) are arranged such that their sides having the steam outlet passage (24) and the steam inlet passage (26) respectively are directly adjacent to and face one another.

4. A multistage membrane distillation apparatus in accordance with claim 1, wherein the heating stage (28), in which the supplied liquid (14) to be concentrated is preheated, comprises at least one heating unit ($30_1$) and at least one evaporator unit (V), wherein a respective heating unit ($30_1$) comprises a heating fluid space (34) at least partly bounded by a fluid-tight, heat-conducting wall (32) and a respective evaporator unit (V) comprises a steam space ($18_2$) at least partly bounded by a steam-permeable, liquid-tight membrane wall (20) and at least one flow passage (22) is provided in the heating stage (28) between a heating unit ($30_1$) and an evaporator unit (V) adjacent to the heating unit ($30_1$) and conducts the liquid (14) to be concentrated such that the liquid (14) to be concentrated is preheated via the fluid-tight, heat-conducting wall (32) and the steam arising from the liquid (14) to be concentrated moves through the membrane wall (20) into the steam space ($18_2$).

5. A multistage membrane distillation apparatus in accordance with claim 4, wherein the steam is conveyed from the steam space ($18_2$) of a respective evaporator unit (V) of the heating stage (28) into a condensation unit (K) of the directly following condensation/evaporation stage ($12_1$-$12_3$) via a steam passage (24, 26) which only conveys this steam and which only conveys this steam onward to the directly following condensation/evaporation stage ($12_1$-$12_3$), wherein the steam is conveyed from the steam space ($18_2$) of a respective evaporator unit (V) of the heating stage (28) via the respective steam channel (24, 26) respectively into only one condensation unit (K) of the directly following condensation/evaporation stage ($12_1$-$12_3$).

6. A multistage membrane distillation apparatus in accordance with claim 4, wherein the heating stage (28) has a plurality of heating units ($30_1$) and/or a plurality of evaporator units (V) as well as a plurality of flow passages (22) each formed between a heating unit ($30_1$) and an evaporator unit (V) adjoining it, said flow passages extending in parallel with each other and conducting the liquid (14) to be concentrated.

7. A multistage membrane distillation apparatus in accordance with claim 4, wherein the evaporator unit (V) has a steam outlet passage (24) and the condensation unit (K) has a steam inlet passage (26) for forming a respective steam passage (24, 26) between a respective evaporator unit (V) of the heating stage (28) and a respective condensation unit (K) of the directly following condensation/evaporation stage ($12_1$-$12_3$) and the evaporator unit (V) and the condensation unit (K) are arranged such that their sides having the steam outlet passage (24) and the steam inlet passage (26) respectively are directly adjacent to and face one another.

8. A multistage membrane distillation apparatus in accordance with claim 4, wherein the steam from a respective evaporator unit (V) of the at least one of condensation/evaporation stage ($12_3$) or of a plurality of condensation/evaporation stages ($12_3$) is supplied to the condensation stage (36) disposed directly downstream of the last of the at least one of the plurality of condensation/evaporation stages ($12_3$).

9. A multistage membrane distillation apparatus in accordance with claim 8, wherein the condensation stage (36) comprises at least one cooling unit ($30_2$) and at least one condensation unit (K), wherein a respective cooling unit ($30_2$) comprises a cooling fluid space (38) at least partly bounded by a fluid-tight, heat-conducting wall (32) and a respective condensation unit (K) again comprises a steam space ($18_1$) which is at least partly bounded by a condensation wall (16) and to which steam from the last of the at least one condensation/evaporation stage ($12_3$) ($12_3$) is supplied via a respective steam passage (24, 26) and at least one cooling unit ($30_2$) is directly adjacent to at least one condensation unit (K) in the condensation stage (K) such that the condensation wall (16) of the respective condensation unit (K) is cooled via the cooling unit ($30_2$).

10. A multistage membrane distillation apparatus in accordance with claim 9, wherein the steam is conducted into a condensation unit (K) of the condensation stage (36) from a respective evaporator unit (V) of the last of the at least one of the plurality of condensation/evaporation stages ($12_3$) via a steam passage (24, 26) only conducting this steam and only conducting it onward to the condensation stage (36).

11. A multistage membrane distillation apparatus in accordance with claim 9, wherein the condensation stage (36) comprises a plurality of cooling units ($30_2$) and/or a plurality of condensation units (K).

12. A multistage membrane distillation apparatus in accordance with claim 9, wherein the steam from the second steam space ($18_2$) of a respective evaporator unit (V) of the one condensation/evaporation stage ($12_3$) or of the last one of the plurality of condensation/evaporation stages ($12_3$) is conveyed via the respective steam passage (24, 26) respectively into only one condensation unit (K) of the condensation stage (36).

13. A multistage membrane distillation apparatus in accordance with claim 12, wherein the evaporator units (V) have steam outlet passages (24) and the condensation units (K) have steam inlet passages (26) for forming a respective steam passage (24, 26) between a respective evaporator unit (V) of the one condensation/evaporation stage ($12_3$) or of the last one of the plurality of condensation/evaporation stages ($12_3$) and a respective condensation unit (K) of the directly following condensation stage (36) and wherein the respective evaporator unit (V) and respective condensation unit (K) are arranged such that their sides having the steam outlet passage (24) and the steam inlet passage (26) respectively are directly adjacent to and face one another.

14. A multistage membrane distillation apparatus in accordance with claim 1, said apparatus being configured as a modular flow system comprising a plurality of frame elements and different functional units, said different functional units each being provided configured to a form of such a frame element.

15. A multistage distillation apparatus in accordance with claim 14, wherein the different functional units are selected from the group of members consisting of a respective condensation unit (K), a respective evaporator unit (V), a respective heating unit ($30_1$) and a respective cooling unit ($30_2$).

16. A multistage membrane distillation apparatus in accordance with claim 14, wherein the frame elements are provided with web structures (40) via which they can be connected to one another, wherein each of the frame elements comprise an inner region (44) which is surrounded by an outer frame (42).

17. A multistage membrane distillation apparatus in accordance with claim 16, wherein the frame elements are connected to one another to form at least one of the heating stage (28), a respective condensation/evaporation stage ($12_1$-$12_3$) and the condensation stage (36).

18. A multistage membrane distillation apparatus in accordance with claim 16, wherein the outer frame (42) is provided with a grid-like spacer (46).

19. A multistage membrane distillation apparatus in accordance with claim 18, wherein a respective functional surface is applied on two sides of the grid-like spacer (46) for forming at least one of a respective steam space ($18_1$, $18_2$), a respective heating fluid space (34) and a respective cooling fluid space (38).

20. A multistage membrane distillation apparatus in accordance with claim 19, wherein the functional surface is one of a film and a membrane.

21. A multistage membrane distillation apparatus in accordance with claim 1, said apparatus comprising at least three condensation/evaporation stages ($12_1$-$12_3$).

* * * * *